(12) United States Patent
Easwar et al.

(10) Patent No.: US 7,194,032 B1
(45) Date of Patent: Mar. 20, 2007

(54) CIRCUIT AND METHOD FOR MODIFYING A REGION OF AN ENCODED IMAGE

(75) Inventors: Venkat V. Easwar, Cupertino, CA (US); John S. O'Donnell, Seattle, WA (US); Ramachandran Natarajan, Santa Clara, CA (US); Robert J. Grove, Los Gatos, CA (US)

(73) Assignee: Equator Technologies, Inc., Seattle, WA (US)

( * ) Notice: Subject to any disclaimer, the term of this patent is extended or adjusted under 35 U.S.C. 154(b) by 0 days.

(21) Appl. No.: 09/390,241

(22) Filed: Sep. 3, 1999

(51) Int. Cl.
*H04B 1/66* (2006.01)
(52) U.S. Cl. .............................. 375/240.12
(58) Field of Classification Search .......... 375/240.08, 375/240.26, 240.16, 240.12; 348/586, 600; 345/629; 725/131–137, 139–142; *H04B 1/66*
See application file for complete search history.

(56) References Cited

U.S. PATENT DOCUMENTS

| | | | |
|---|---|---|---|
| 5,493,638 A * | 2/1996 | Hooper et al. .............. | 345/636 |
| 5,559,562 A * | 9/1996 | Ferster ....................... | 348/584 |
| 5,623,424 A | 4/1997 | Azadegan et al. | |
| 5,887,110 A | 3/1999 | Sakamoto et al. | |
| 5,907,374 A * | 5/1999 | Liu ........................ | 375/240.26 |
| 5,933,500 A * | 8/1999 | Blatter et al. ............... | 380/200 |
| 6,215,483 B1 * | 4/2001 | Zigmond .................... | 725/112 |
| 6,219,043 B1 | 4/2001 | Yogeshwar et al. | |
| 6,226,041 B1 | 5/2001 | Florencio et al. | |
| 6,314,139 B1 | 11/2001 | Koto et al. | |
| 6,459,427 B1 * | 10/2002 | Mao et al. ................... | 725/109 |
| 6,498,816 B1 * | 12/2002 | Easwar et al. .......... | 375/240.26 |
| 6,507,618 B1 * | 1/2003 | Wee et al. ............. | 375/240.16 |
| 6,532,593 B1 * | 3/2003 | Moroney .................... | 725/142 |
| 6,594,311 B1 * | 7/2003 | Pearlstein .............. | 375/420.01 |
| 6,697,061 B1 * | 2/2004 | Wee et al. .................. | 345/419 |

(Continued)

FOREIGN PATENT DOCUMENTS

EP  0 650 298 A1  4/1995

(Continued)

OTHER PUBLICATIONS

Chang et al, "Manipulation and Compositing of MC-DCT Compressed Video", IEEE Journal On Selected Areas In Communications, vol. 13, No. 1, pp. 1-11, Jan. 1995.*

*Primary Examiner*—Tung Vo
(74) *Attorney, Agent, or Firm*—Marger Johnson & McCollom P.C.

(57) ABSTRACT

A video processing circuit includes a processor that receives an encoded image having first and second regions, decodes the first region of the image, modifies the decoded first region, and re-encodes the modified first region. Such a circuit allows one to modify a region of an image by decoding and re-encoding only that region instead of the entire image. For example, if one wishes to overlay an EPG on a bottom portion of a video frame, then the circuit can decode only the EPG and the bottom portion of the frame, overlay the decoded EPG on the bottom frame portion, and re-encode the overlaid bottom frame portion. Therefore, this technique often reduces the processing time, and thus the cost and complexity of the processing circuit, as compared to a circuit that decodes and re-encode the entire frame during an image overlay process.

14 Claims, 7 Drawing Sheets

U.S. PATENT DOCUMENTS

2005/0028206 A1* 2/2005 Cameron et al. ............. 725/46

FOREIGN PATENT DOCUMENTS

| EP | 0 805 600 A2 | 11/1997 |
| --- | --- | --- |
| EP | 0 912 063 A2 | 4/1999 |
| WO | WO 94/21079 | 9/1994 |
| WO | WO 95/33342 | 12/1995 |
| WO | WO 99/51033 | 10/1999 |
| WO | WO 00/31979 | 6/2000 |

* cited by examiner

CIRCUIT AND METHOD FOR MODIFYING A REGION OF AN ENCODED IMAGE

TECHNICAL FIELD

The invention relates generally to image-processing techniques, and more particularly to a circuit and method for modifying a region of a encoded image. For example, the invention allows one to blend an electronic program guide (EPG) with a region of an encoded video frame without decoding the entire frame.

BACKGROUND OF THE INVENTION

FIG. 1 is a video image 6, which is a video frame that includes a first region 7 and a second region 8. Although described as a video frame for example purposes, the image 6 may also be a video field. Furthermore, although shown as two rectangles in a top-bottom arrangement, the number, shape, and respective locations of these regions is arbitrary.

Typically, one views a sequence of video frames 6 in their respective entireties. But one may sometimes wish to view another image, i.e., an overlay image, in one of the regions 7 and 8. For example, one may wish to view an electronic program guide (EPG) in the region 8 while he/she is watching a program in the region 7 (and also in the region 8 if the EPG is transparent). Or, one may wish to view an internet order menu in the region 8 while he/she is viewing merchandise for sale in the region 7 (and also in the region 8 if the menu is transparent). Thus, the overlay image is typically a partial frame that is the same size as or that is smaller than the frame region that it overlays, although the overlay frame can overlay an entire video frame. But for simplicity, both partial and full overlay frames are referred to as "overlay frames".

FIG. 2 is a block diagram of a conventional television receiver system 10, which includes a set-top box 11 such as a cable TV (CATV) or satellite TV box, a remote control 12, and a digital video display 13. Generally, the box 11 allows one to view overlay images—such as those that compose an EPG—in the respective regions 7 of a sequence of video frames 6 (FIG. 1). The box 11 includes a processing circuit 14, which receives an encoded, multiplexed broadcast video signal on an input terminal 15, receives command signals from the remote control 12 on a command terminal 16, and generates a video display signal on an output terminal 17. The broadcast video signal includes one or more broadcast channels and one or more overlay frames such as the frames that compose an EPG, and is encoded according to a compression standard such as the Moving Pictures Experts Group (MPEG) standard (discussed below). In response to channel-select and overlay commands from the remote control 12, the circuit 14 blends the video frames from the selected channel with the appropriate overlay frame or frames and generates the display signal as a sequence of these blended video frames. The display 13 receives the display signal from the terminal 17 and decodes and displays the sequence of blended video frames.

More specifically, the processing circuit 14 includes a command decoder 18, which decodes the commands from the remote control 12 and generates corresponding control signals, such as an overlay signal, that control other portions of the processing circuit 14. A channel selector 20 receives the broadcast signal from the terminal 15 and, in response to a channel-select signal from the command decoder 18, demultiplexes the selected channel from the broadcast signal. In response to an overlay signal from the decoder 18, the selector 20 also demultiplexes the selected overlay frames from the broadcast signal. For example, the selector 20 may demultiplex the EPG that corresponds to the selected channel. A video decoder 22 decodes the video frames of the selected channel into pixel-domain frames, i.e., frames of pixel luminance and chromanance values. In response to the overlay signal, the video decoder 22 also decodes the selected overlay frames into the pixel domain, and an overlay/video combiner 24 blends the decoded video frames with the decoded overlay frames. Conversely, if the command decoder 18 does not generate an overlay signal, then the selector 20 does not demultiplex the overlay frames, and thus the combiner 24 merely passes through the decoded video frames from the decoder 22. In one embodiment, the output terminal of the combiner 24 is coupled directly to the output terminal 17. But because it is sometimes undesirable to couple decoded video frames (blended or unblended) directly to the display 13, in another embodiment the circuit 14 includes an optional re-encoder 26, which re-encodes the decoded video frames from the combiner 24 before providing them to the display 13. Although shown as including a number of separate circuit blocks, the processing circuit 14 may include one or more processors that perform the functions of the above-described circuit blocks 18, 20, 22, 24, and 26.

Still referring to FIG. 2, in operation during a period when a viewer does not want to view an overlay frame, he selects a channel with the remote control 12, which generates a corresponding control signal. The control terminal 16, which is typically an infrared detector, receives the control signal and couples it to the command decoder 18. In response to the control signal, the decoder 18 generates the channel-select signal, which causes the channel selector 20 to recover the encoded video signal of the selected channel by demultiplexing the broadcast signal. The video decoder 22 decodes the recovered video signal into frames of pixel values, and the combiner 24 passes these frames to the optional re-encoder 26, which re-encodes the frames and provides a re-encoded video signal to the display 13. If, however, the re-encoder 26 is omitted, then the combiner 24 passes the decoded frames directly to the display 13.

In operation during a period when the viewer wants to view an overlay frame, he selects a channel as described above and also selects an overlay frame or a series of overlay frames, such as an EPG, with the remote control 12. The decoder 18 generates the channel-select signal and an overlay signal, which together cause the channel selector 20 to recover both the encoded video signal of the selected channel and the encoded video signal containing the overlay frame or frames. The overlay signal causes the video decoder 22 to decode the recovered channel and overlay video signals from the channel selector 20 into respective sequences of frames, and causes the combiner 24 to blend the overlay frames with the channel frames to generate blended frames. The optional re-encoder 26 re-encodes these blended frames and provides them to the display 13, which decodes the re-encoded blended frames. If, however, the re-encoder 26 is omitted, then the combiner 24 provides the blended frames directly to the display 13.

Unfortunately, the set-top box 11 cannot utilize the decoding ability of the display 13, and thus includes its own redundant decoding circuitry, which often adds significant size and cost to the box 11. Typically, the display 13 includes channel-select and full decoding circuitry respectively similar to the channel selector 20 and the decoder 22 of the box 11. Thus, the display 13 typically can directly receive the encoded, multiplexed broadcast video signal, recover the encoded video signal of the selected channel, and decode and display the video frames of the recovered video signal. But the display 13 typically cannot blend overlay frames with the video frames. Therefore, to allow such blending, the box 11 includes the same decoding capability (the decoder 22) as the display 13. The viewer, however, typically requests the display of overlay frames for only a small portion of the time that he/she spends watching a program. Therefore, because the blending abilities of the box 11 are needed only a small part of the time, the decoding abilities of the box 11 are redundant to those of the display 13 most of the time. That is, the viewer paid for two full decoders when one decoder will do the job the vast majority of the time! Furthermore, where it is desired to provide the display 13 with an encoded video signal, the processing circuitry also includes the re-encoder 26, which adds even more size and expense to the box 11!

To help the reader more easily understand the concepts discussed below in the description of the invention, following is a basic overview of conventional video-compression techniques.

To electronically transmit a relatively high-resolution image over a relatively low-band-width channel, or to electronically store such an image in a relatively small memory space, it is often necessary to compress the digital data that represents the image. Such image compression typically involves reducing the number of data bits necessary to represent an image. For example, High-Definition-Television (HDTV) video images are compressed to allow their transmission over existing television channels. Without compression, HDTV video images would require transmission channels having bandwidths much greater than the bandwidths of existing television channels. Furthermore, to reduce data traffic and transmission time to acceptable levels, an image may be compressed before being sent over the internet. Or, to increase the image-storage capacity of a CD-ROM or server, an image may be compressed before being stored thereon.

Referring to FIGS. 3–6, the basics of the popular block-based Moving Pictures Experts Group (MPEG) compression standards, which include MPEG-1 and MPEG-2, are discussed. For purposes of illustration, the discussion is based on using an MPEG 4:2:0 format to compress video images represented in a Y, $C_B$, $C_R$ color space. However, the discussed concepts also apply to other MPEG formats, to images that are represented in other color spaces, and to other block-based compression standards such as the Joint Photographic Experts Group (JPEG) standard, which is often used to compress still images. Furthermore, although many details of the MPEG standards and the Y, $C_B$, $C_R$ color space are omitted for brevity, these details are well-known and are disclosed in a large number of available references.

Still referring to FIGS. 3–6, the MPEG standards are often used to compress temporal sequences of images—video frames for purposes of this discussion—such as found in a television broadcast. Each video frame is divided into sub-regions called macro blocks, which each include one or more pixels. FIG. 3A is a 16-pixel-by-16-pixel macro block 30 having 256 pixels 32 (not drawn to scale). In the MPEG standards, a macro block is always 16×16 pixels, although other compression standards may use macro blocks having other dimensions. In the original video frame, i.e., the frame before compression, each pixel 32 has a respective luminance value Y and a respective pair of color-, i.e., chroma-, difference values $C_B$ and $C_R$.

Referring to FIGS. 3A–3D, before compression of the frame, the digital luminance (Y) and chroma-difference ($C_B$ and $C_R$) values that will be used for compression, i.e., the pre-compression values, are generated from the original Y, $C_B$, and $C_R$ values of the original frame. In the MPEG 4:2:0 format, the pre-compression Y values are the same as the original Y values. Thus, each pixel 32 merely retains its original luminance value Y. But to reduce the amount of data to be compressed, the MPEG 4:2:0 format allows only one pre-compression $C_B$ value and one pre-compression $C_R$ value for each group 34 of four pixels 32. Each of these pre-compression $C_B$ and $C_R$ values are respectively derived from the original $C_B$ and $C_R$ values of the four pixels 32 in the respective group 34. For example, a pre-compression $C_B$ value may equal the average of the original $C_B$ values of the four pixels 32 in the respective group 34. Thus, referring to FIGS. 3B–3D, the pre-compression Y, $C_B$, and $C_R$ values generated for the macro block 10 are arranged as one 16×16 matrix 36 of pre-compression Y values (equal to the original Y value for each pixel 32), one 8×8 matrix 38 of pre-compression $C_B$ values (equal to one derived $C_B$ value for each group 34 of four pixels 32), and one 8×8 matrix 40 of pre-compression $C_R$ values (equal to one derived $C_R$ value for each group 34 of four pixels 32). The matrices 36, 38, and 40 are often called "blocks" of values. Furthermore, because it is convenient to perform the compression transforms on 8×8 blocks of pixel values instead of 16×16 blocks, the block 36 of pre-compression Y values is subdivided into four 8×8 blocks 42a–42d, which respectively correspond to the 8×8 blocks A–D of pixels in the macro block 30. Thus, referring to FIGS. 3A–3D, six 8×8 blocks of pre-compression pixel data are generated for each macro block 30: four 8×8 blocks 42a–42d of pre-compression Y values, one 8×8 block 38 of pre-compression $C_B$ values, and one 8×8 block 40 of pre-compression $C_R$ values.

FIG. 4 is a block diagram of an MPEG compressor 50, which is more commonly called an encoder. Generally, the encoder 50 converts the pre-compression data for a frame or sequence of frames into encoded data that represent the same frame or frames with significantly fewer data bits than the pre-compression data. To perform this conversion, the encoder 50 reduces or eliminates redundancies in the pre-compression data and reformats the remaining data using efficient transform and coding techniques.

More specifically, the encoder 50 includes a frame-reorder buffer 52, which receives the pre-compression data for a sequence of one or more frames and reorders the frames in an appropriate sequence for encoding. Thus, the reordered sequence is often different than the sequence in which the frames are generated and will be displayed. The encoder 50 assigns each of the stored frames to a respective group, called a Group Of Pictures (GOP), and labels each frame as either an intra (I) frame or a non-intra (non-I) frame. For example, each GOP may include three I frames and 12 non-I frames for a total of fifteen frames. The encoder 50 always encodes an I frame without reference to another frame, but can and often does encode a non-I frame with reference to one or more of the other frames in the GOP. The encoder 50 does not, however, encode a non-I frame with reference to a frame in a different GOP.

During the encoding of an I frame, the 8×8 blocks (FIGS. 3B–3D) of the pre-compression Y, $C_B$, and $C_R$ values that represent the I frame pass through a summer 54 to a Discrete Cosine Transformer (DCT) 56, which transforms these blocks of values into respective 8×8 blocks of one DC (zero frequency) coefficient and sixty-three AC (non-zero frequency) coefficients. That is, the summer 54 is not needed when the encoder 50 encodes an I frame, and thus the pre-compression values pass through the summer 54 without being summed with any other values. As discussed below, however, the summer 54 is often needed when the encoder 50 encodes a non-I frame. A quantizer 58 limits each of the coefficients to a respective maximum value, and provides the quantized AC and DC coefficients on respective paths 60 and 62. A prediction encoder 64 predictively encodes the DC coefficients, and a variable-length coder 66 converts the quantized AC coefficients and the quantized and predictively encoded DC coefficients into variable-length codes, such as Huffman codes. These codes form the encoded data that represent the pixel values of the encoded I frame. A transmit buffer 68 then temporarily stores these codes to allow synchronized transmission of the encoded data to a decoder (discussed below in conjunction with FIG. 6). Alternatively, if the encoded data is to be stored instead of transmitted, the coder 66 may provide the variable-length codes directly to a storage medium such as a CD-ROM.

If the I frame will be used as a reference (as it often will be) for one or more non-I frames in the GOP, then, for the following reasons, the encoder 50 generates a corresponding reference frame by decoding the encoded I frame with a decoding technique that is similar or identical to the decoding technique used by the decoder (FIG. 6). When decoding non-I frames that are referenced to the I frame, the decoder has no option but to use the decoded I frame as a reference frame. Because MPEG encoding and decoding are lossy—some information is lost due to quantization of the AC and DC transform coefficients—the pixel values of the decoded I frame will often be different than the pre-compression pixel values of the I frame. Therefore, using the pre-compression I frame as a reference frame during encoding may cause additional artifacts in the decoded non-I frame because the reference frame used for decoding (decoded I frame) would be different than the reference frame used for encoding (pre-compression I frame).

Therefore, to generate a reference frame for the encoder that will be similar to or the same as the reference frame for the decoder, the encoder 50 includes a dequantizer 70 and an inverse DCT 72, which are designed to mimic the dequantizer and inverse DCT of the decoder (FIG. 6). The dequantizer 70 dequantizes the quantized DCT coefficients from the quantizer 58, and the inverse DCT 72 transforms these dequantized DCT coefficients into corresponding 8×8 blocks of decoded Y, $C_B$, and $C_R$ pixel values, which compose the reference frame. Because of the losses incurred during quantization, however, some or all of these decoded pixel values may be different than their corresponding pre-compression pixel values, and thus the reference frame may be different than its corresponding pre-compression frame as discussed above. The decoded pixel values then pass through a summer 74 (used when generating a reference frame from a non-I frame as discussed below) to a reference-frame buffer 76, which stores the reference frame.

During the encoding of a non-I frame, the encoder 50 initially encodes each macro-block of the non-I frame in at least two ways: in the manner discussed above for I frames, and using motion prediction, which is discussed below. The encoder 50 then saves and transmits the resulting code having the fewest bits. This technique insures that the macro blocks of the non-I frames are encoded using the fewest bits.

With respect to motion prediction, an object in a frame exhibits motion if its relative position changes in the succeeding frames. For example, a horse exhibits relative motion if it gallops across the screen. Or, if the camera follows the horse, then the background exhibits relative motion with respect to the horse. Generally, each of the succeeding frames in which the object appears contains at least some of the same macro blocks of pixels as the preceding frames. But such matching macro blocks in a succeeding frame often occupy respective frame locations that are different than the respective frame locations they occupy in the preceding frames. Alternatively, a macro block that includes a portion of a stationary object (e.g., tree) or background scene (e.g., sky) may occupy the same frame location in each of a succession of frames, and thus exhibit "zero motion". In either case, instead of encoding each frame independently, it takes fewer data bits to tell the decoder "the macro blocks R and Z of frame 1 (non-I frame) are the same as the macro blocks that are in the locations S and T, respectively, of frame 0 (I frame)." This "statement" is encoded as a motion vector. For a relatively fast moving object, the location values of the motion vectors are relatively large. Conversely, for a stationary or relatively slow-moving object or background scene, the location values of the motion vectors are relatively small or equal to zero.

FIG. 5 illustrates the concept of motion vectors with reference to the non-I frame 1 and the I frame 0 discussed above. A motion vector $MV_R$ indicates that a match for the macro block in the location R of frame 1 can be found in the location S of frame 0. $MV_R$ has three components. The first component, here 0, indicates the frame (here frame 0) in which the matching macro block can be found. The next two components, $X_R$ and $Y_R$, together comprise the two-dimensional location value that indicates where in the frame 0 the matching macro block can be found. Thus, in this example, because the location S of the frame 0 has the same X,Y coordinates as the location R in the frame 1, $X_R=Y_R=0$. Conversely, the macro block in the location T matches the macro block in the location Z, which has different X,Y coordinates than the location T. Therefore, $X_Z$ and $Y_Z$ represent the location T with respect to the location Z. For example, suppose that the location T is ten pixels to the left of (negative X direction) and seven pixels down from (negative Y direction) the location Z. Therefore, $MV_Z=(0, -10, -7)$. Although there are many other motion-vector schemes available, they are all based on the same general concept.

Referring again to FIG. 4, motion prediction is now discussed in detail. During the encoding of a non-I frame, a motion predictor 78 compares the pre-compression Y values (the $C_B$ and $C_R$ values are not used during motion prediction) of the macro blocks in the non-I frame to the decoded Y values of the respective a macro blocks in the reference frame and identifies matching macro blocks. For each macro block in the non-I frame for which a match is found in the reference frame, the motion predictor 78 generates a motion vector that identifies the reference frame and the location of the matching macro block within the reference frame. Thus, as discussed below in conjunction with FIG. 6, during decoding of these motion-encoded macro blocks of the non-I frame, the decoder uses the motion vectors to obtain the pixel values of the motion-encoded macro blocks from the matching macro blocks in the reference frame. The prediction encoder 64 predictively encodes the motion vectors, and the coder 66 generates respective codes for the encoded motion vectors and provides these codes to the transmit buffer 48.

Furthermore, because a macro block in the non-I frame and a matching macro block in the reference frame are often similar but not identical, the encoder 50 encodes these differences along the with motion vector so that the decoder can account for them. More specifically, the motion predictor 78 provides the decoded Y values of the matching macro block of the reference frame to the summer 54, which effectively subtracts, on a pixel-by-pixel basis, these Y values from the pre-compression Y values of the matching macro block of the non-I frame. These differences, which are called residuals, are arranged in 8×8 blocks and are processed by the DCT 56, the quantizer 58, the coder 66, and the buffer 68 in a manner similar to that discussed above, except that the quantized DC coefficients of the residual blocks are coupled directly to the coder 66 via the line 60, and thus are not predictively encoded by the prediction encoder 44.

Additionally, it is possible to use a non-I frame as a reference frame. When a non-I frame will used as a reference frame, the quantized residuals from the quantizer 58 are respectively dequantized and inverse transformed by the dequantizer 70 and the inverse DCT 72 so that this non-I reference frame will be the same as the one used by the decoder for the reasons discussed above. The motion predictor 78 provides to the summer 74 the decoded Y values of the I reference frame from which the residuals were generated. The summer 74 adds the respective residuals from the circuit 72 to these decoded Y values of the I reference frame to generate the respective Y values of the non-I reference frame. The reference frame buffer 76 then stores the non-I reference frame along with the I reference frame for use in encoding subsequent non-I frames.

Still referring to FIG. 4, the encoder 50 also includes a rate controller 80 to insure that the transmit buffer 68, which typically transmits the encoded frame data at a fixed rate, never overflows or empties, i.e., underflows. If either of these conditions occurs, errors may be introduced into the encoded data stream. For example, if the buffer 68 overflows, data from the coder 66 is lost. Thus, the rate controller 80 uses feed back to adjust the quantization scaling factors used by the quantizer 58 based on the degree of fullness of the transmit buffer 68. The fuller the buffer 68, the larger the controller 80 makes the scale factors, and the fewer data bits the coder 66 generates. Conversely, the more empty the buffer 68, the smaller the controller 80 makes the scale factors, and the more data bits the coder 66 generates. This continuous adjustment insures that the buffer 68 neither overflows nor underflows.

FIG. 6 is a block diagram of a conventional MPEG decompresser 82, which is commonly called a decoder and which can decode frames that are encoded by the encoder 60 of FIG. 4.

For I frames and macro blocks of non-I frames that are not motion predicted, a variable-length decoder 84 decodes the variable-length codes received from the encoder 50. A prediction decoder 86 decodes the predictively encoded DC coefficients, and a dequantizer 87, which is similar or identical to the dequantizer 70 of FIG. 4, dequantizes the decoded AC and DC transform coefficients. An inverse DCT 88, which is similar or identical to the inverse DCT 72 of FIG. 4, transforms the dequantized coefficients into pixel values. The decoded pixel values pass through a summer 90—which is used during the decoding of motion-predicted macro blocks of non-I frames as discussed below—into a frame-reorder buffer 92, which stores the decoded frames and arranges them in a proper order for display on a video display unit 94. If a decoded I frame is used as a reference frame, it is also stored in the reference-frame buffer 96.

For motion-predicted macro blocks of non-I frames, the decoder 84, dequantizer 87, and inverse DCT 88 process the residuals as discussed above in conjunction with FIG. 4. The prediction decoder 86 decodes the motion vectors, and a motion interpolator 98 provides to the summer 90 the pixel values from the reference-frame macro blocks that the motion vectors point to. The summer 90 adds these reference pixel values to the residuals to generate the pixel values of the decoded macro blocks, and provides these decoded pixel values to the frame-reorder buffer 92. If a decoded non-I frame is used as a reference frame, it is stored in the reference-frame buffer 96.

Referring to FIGS. 4 and 6, although described as including multiple functional circuit blocks, the encoder 50 and the decoder 82 may be implemented in hardware, software, or a combination of both. For example, the encoder 50 and the decoder 82 are often implemented by a respective one or more processors that perform the respective functions of the circuit blocks.

More detailed discussions of the MPEG encoder 50 and decoder 82 of FIGS. 4 and 6, respectively, and of the MPEG standard in general are available in many publications including "Video Compression" by Peter D. Symes, McGraw-Hill, 1998, which is incorporated by reference. Furthermore, there are other well-known block-based compression techniques for encoding and decoding images.

SUMMARY OF THE INVENTION

In one aspect of the invention, a video processing circuit includes a processor that receives an encoded image having first and second regions, decodes the first region of the image, modifies the decoded first region, and re-encodes the modified first region.

Such a circuit allows one to modify a region of an image by decoding and re-encoding only that region instead of the entire image. For example, if one wishes to overlay an EPG on a bottom portion of a video frame, then the circuit can decode only the EPG and the bottom portion of the frame, overlay the decoded EPG on the bottom frame portion, and re-encode the overlaid bottom frame portion. Therefore, this technique often reduces the processing time, and thus the cost and complexity of the processing circuit, as compared to a circuit that decodes and re-encodes the entire frame during an image overlay process.

DETAILED DESCRIPTION OF THE INVENTION

Formatting Encoded Video Images into Respective Multiple Independent Regions

Figure 7:
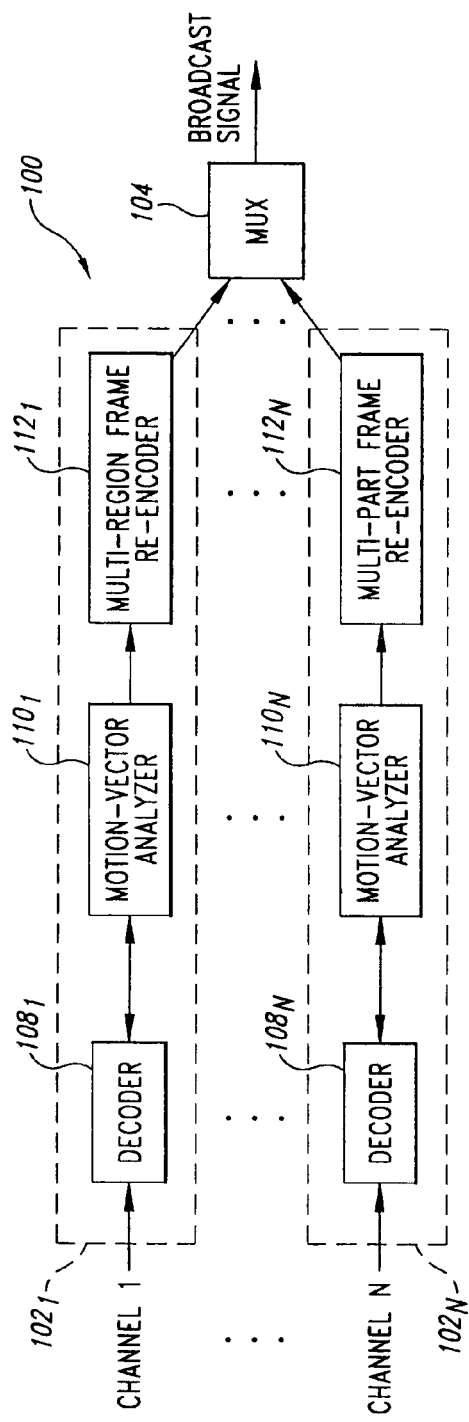
FIG. 7 is a block diagram of a video-frame formatter according to an embodiment of the invention.

FIG. 7 is a block diagram of a video-frame formatter 100 according to an embodiment of the invention. The formatter 100 includes video processing circuits $102_1$–$102_N$ for respectively formatting encoded video-channel signals 1–N received from respective broadcaster networks (e.g., FOX, CNN). Specifically, the processing circuits 102 format the frames of each respective channel signal such that the frames each have multiple independent regions. The processing circuits 102 then provide the respective processed channel signals 1–N to a multiplexer 104, which combines all of the processed channel signals into an encoded multiplexed broadcast video signal. Although described as formatting video frames, the formatter 100 can be designed to modify video fields or still images.

For example purposes, the structure and operation of the video processing circuit $102_1$ is discussed in detail, it being understood that the processing circuits $102_2$–$102_N$ are similar. The processing circuit $102_1$ includes a decoder $108_1$ for decoding the channel signal 1, which in one embodiment is encoded according to a compression standard that is the same as or is similar to the MPEG compression standard described in conjunction with FIGS. 3–6. A motion-vector analyzer $110_1$ receives the decoded channel signal and identifies macro blocks having motion vectors that point from one region of a frame to a different region of the same or another frame. That is, the analyzer $110_1$ identifies a macro block in a region of a frame if the macro block has a motion vector that points to a reference macro block in a different region of the same or another frame. A multi-region frame re-encoder $112_1$ re-encodes the identified macro blocks such that no identified macro block has a motion vector pointing to a region of a frame that is different from the region containing the identified macro block. In one embodiment, the re-encoder $112_1$ re-encodes an identified macro block in a region of a frame such that the macro block has a motion vector that points to a reference macro block in the same region of another frame. For example, the encoder $112_1$ may encode the macro block to have a motion vector with a location value=(0, 0). In another embodiment, the re-encoder 112 re-encodes an identified macro block as an I block such that it has no motion vector.

Figure 8:
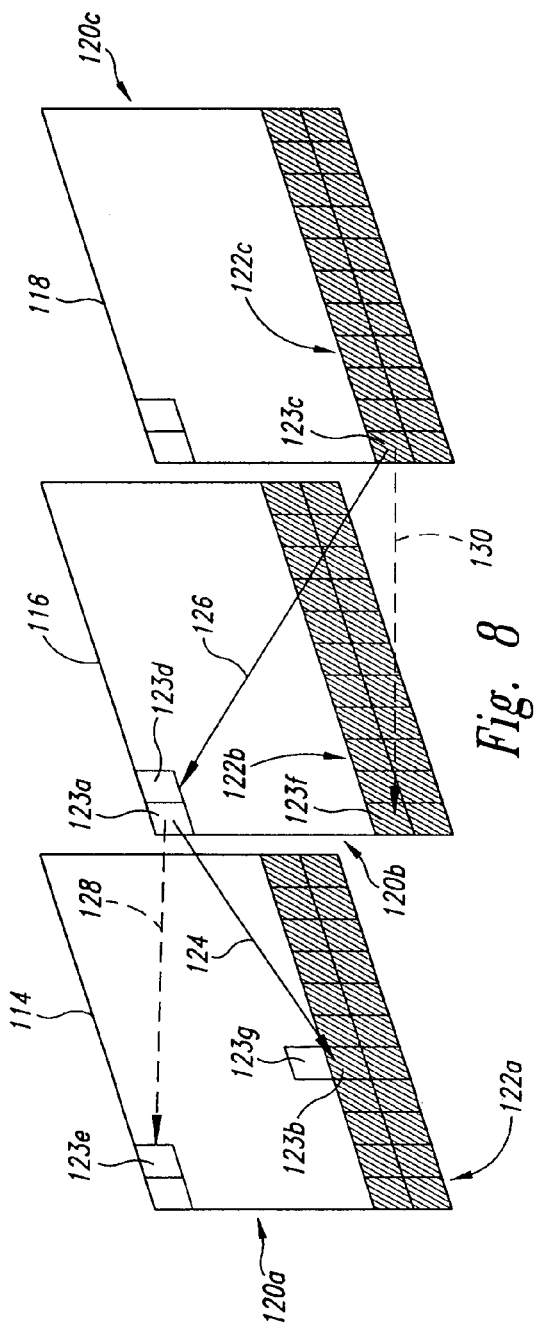
FIG. 8 is a diagram of a group of multi-region video frames generated by the formatter of FIG. 7.

Referring to FIGS. 7–8, the operation of the processing circuit $102_1$ is discussed. FIG. 8 shows a group of three video frames 114, 116, and 118. In this example, the frame 114 is an I frame and the frames 116 and 118 are non-I frames. The circuit $102_1$ formats each of the frames 114, 116, and 118 into multiple regions, here two regions 120*a* and 122*a*, 120*b* and 122*b*, and 120*c* and 122*c*, respectively. The first regions 120*a*–120*c* (unshaded) occupy the same respective upper areas of the frames 114, 116, and 118, and the second regions 122*a*–122*c* (shaded) occupy the same respective lower areas of the frames 114, 116, and 118. Both sets of regions 120*a*–120*c* and 122*a*–122*c* contain respective macro blocks 123.

The decoder $108_1$ decodes the video frames, motion vectors, and other components of the channel 1 signal. In one embodiment, the decoder $108_1$ conventionally decodes each macro block in every frame down to its respective pixel values, i.e., down to the pixel domain. But as discussed below, because the decoder $108_1$ does not decode the channel 1 signal for display, it may conventionally decode the macro blocks down only to their DCT coefficients, i.e., down to the transform domain. Alternatively, as discussed below, the decoder $108_1$ may decode only some of the macro blocks in a frame. Such partial decoding often reduces the cost, complexity, and decoding time of the decoder $108_1$ as compared to known decoders.

The motion-vector analyzer $110_1$ then examines the decoded motion vectors from the decoder $108_1$ and identifies the macro blocks having motion vectors that point from one of the first regions 120*a*–120*c* to one of the second regions 122*a*–122*c* and vice versa. For example, the analyzer $110_1$ identifies the decoded motion vectors 124 and 126 (shown in solid line) as being "boundary-crossing" vectors. Specifically, the analyzer $110_1$ determines that the decoded motion vector 124 points from a macro block 123*a* in the region 120*b* of the frame 116 to a reference macro block 123*b* in the region 122*a* of the frame 114. Likewise, the analyzer $110_1$ determines that the decoded motion vector 126 points from a macro block 123*c* in the region 122*c* of the frame 118 to a reference macro block 123*d* in the region 120*b* of the frame 116. (The differences in the relative frame locations between the macro blocks 122*a* and 122*c* and the reference macro blocks 122*b* and 122*d*, respectively, are exaggerated for purposes of illustration.) Thus, the analyzer $110_1$ identifies the motion vectors 124 and 126 as crossing the "boundary" between the first regions 120*a*–120*c* and the second regions 122*a*–122*c*, and informs the re-encoder $112_1$ that the macro blocks 123*a* and 123*c* have boundary-crossing motion vectors.

In one embodiment, the re-encoder $112_1$ generates substitute motion vectors for the macro blocks having boundary-crossing motion vectors. For example, the re-encoder $112_1$ generates substitute motion vectors 128 and 130 (shown in dashed line) for the macro blocks 123*a* and 123*d*, respectively. Specifically, the substitute motion vector 128 points from its macro block 123*a* in the region 120*b* to a reference macro block 123*e* in the region 120*a*, and the substitute motion vector 130 points from its macro block 123*c* in the region 122*c* to a reference macro block 123*f* in the region 122*b*. Thus, neither of the substitute motion vectors 128 and 130 crosses the boundary between the first regions 120*a*–120*c* and the second regions 122*a*–122*c*. By eliminating boundary-crossing motion vectors such as the motion vectors 124 and 126, the re-encoder $112_1$ re-encodes the regions 120*a*–120*c* so that they are independent of the regions 122*a*–122*c*. That is, the first regions 120*a*–120*c* are encoded with no reference to the second regions 122*a*–122*c*, and the second regions 122*a*–122*c* are encoded with no reference to the first regions 120*a*–120*c*. Such independent regions are often called "slices" in MPEG terminology. As discussed below in conjunction with FIG. 9, such independently encoded first and second regions 120*a*–120*c* and 122*a*–122*c* allow one to modify one set of the regions, for example the regions 122*a*–122*c*, without having to decode the other set or sets of regions, for example the regions 120*a*–120*c*. Furthermore, as discussed below, although the substitute motion vectors 128 and 130 are shown as having nonzero and zero location values respectively, both may have either nonzero or zero location values in other examples. Additionally, although the substitute motion vectors 128 and 130 are shown pointing to the same frames 114 and 116 as the boundary-crossing motion vectors 124 and 126, respectively, they may point to different frames in other examples.

In one embodiment, the re-encoder $112_1$ generates the substitute motion vectors by conventionally scanning the appropriate frame regions for the best reference macro blocks and then motion encoding the original macro blocks using the new reference macro blocks. For example, to generate the substitute motion vector 128, the re-encoder $112_1$ scans the region 120a and determines that the macro block 123e is the best reference macro block in the region 120a. In one embodiment, the re-encoder $112_1$ starts scanning at the macro block 123g, which is the macro block in the region 120a that is closest to the original reference block 123b. Thus, the reference block 123e replaces the original reference block 123b. Then, as discussed above in conjunction with FIG. 4, the re-encoder $112_1$ motion encodes the block 123a using the substitute reference block 123e instead of the reference block 123b.

To allow the re-encoder $112_1$ to perform such scanning and motion encoding, the decoder $108_1$ decodes at least the identified macro blocks, the reference macro blocks, and the macro blocks in the scan regions such as the region 120a. For example, if the re-encoder $112_1$ is constructed to generate substitute motion vectors that point to the same respective frames as the original motion vectors, then the decoder $108_1$ can be constructed to decode only the identified macro blocks and the frames to which the identified motion vectors point. Alternatively, the decoder $108_1$ can be constructed to decode only the identified macro blocks, the reference macro blocks, and the regions of the pointed-to frames that correspond to the regions containing the identified macro blocks. For example, the decoder $108_1$ can be constructed to recognize that the substitute motion vector 128 will point to the region 120a, which corresponds to the region 120b of the identified macro block 123a. Based upon this recognition, the decoder $108_1$ decodes the macro blocks 123a and 123b and all the macro blocks in the region 120a, which is the region to be scanned by the re-encoder $112_1$. Of course the decoder $108_1$ can be constructed to decode all of the frames in their entireties.

To allow the decoder $108_1$ to determine which macro blocks to decode, in one embodiment the decoder $108_1$ and analyzer $110_1$ interact in the following manner. First, the decoder $108_1$ decodes the motion vectors for a frame. Then, the analyzer $110_1$ determines the cross-boundary motion vectors, the macro blocks to which they belong, the reference macro blocks to which they point, and the frame scan regions that contain the reference macro blocks.

Next, the motion analyzer $110_1$ provides the decoder $108_1$ with the identifies of the macro blocks having cross-boundary motion vectors, the reference macro blocks, and the macro blocks in the scan regions that the re-encoder $112_1$ will scan during motion re-encoding. The decoder 108, then decodes these identified macro blocks and provides the decoded macro blocks to the re-encoder $112_1$ via the analyzer $110_1$.

Alternatively, to decrease its complexity and encoding time, the re-encoder $112_1$ can be constructed to generate all the substitute motion vectors having location values of zero. This eliminates the need to scan a frame region because the substitute reference macro blocks are inherently known. For example, to generate the substitute motion vector 130 having a location value of zero as shown in FIG. 8, the re-encoder $112_1$ need not scan the region 122b for the best substitute reference macro block because it is constrained to use the macro block 123f as the substitute reference block.

That is, the block 123f is the only reference block that will give the vector 130 a location value of zero. Therefore, without scanning the region 122b, the re-encoder $112_1$ selects the block 123f as the substitute reference block and then motion encodes the macro block 123c using the substitute reference block 123f instead of the original reference block 123d. Although this scanless encoding is faster and less complex than the scan encoding described above, scanless encoding is often less efficient, i.e., generates more bits per pixel, than scan encoding.

In another embodiment, to further reduce its complexity and encoding time, the re-encoder $112_1$ is constructed to encode the identified macro blocks as I-encoded blocks such that they have no motion vectors. Although encoding is faster and less complex than the motion (non-I) encoding techniques discussed above, it is often less efficient than motion encoding.

In addition to re-encoding the identified macro blocks, the re-encoder $112_1$ re-encodes the substitute motion vectors and any other decoded portions of the channel 1 signal and provides the re-encoded channel 1 signal, which includes the re-encoded video frames formatted into independent regions, to the multiplexer 104.

For any of the above described frame-formatting embodiments, the decoder $108_1$ can be constructed to decode down to either the transform domain or to the pixel domain. Because the DCT is a linear transform, the re-encoder $112_1$ can scan, motion encode, and I encode using DCT coefficients as well as using pixel valves.

Furthermore, although shown as including separate circuit blocks $108_1$, $110_1$, and $112_1$, the processing circuit $102_1$ may include one or more respective processors that perform the functions of these circuit blocks in hardware, software or a combination of hardware and software. Additionally, the above-described functions may be performed in an order other than that described above.

Additionally, although shown as rectangles at the tops and bottoms of the frames 114, 116, and 118, the regions 120a–120c and 122a–122c can be located elsewhere within the respective frames and can have other dimensions. Therefore, in one embodiment, the processing circuit 102, includes the region dimensions and locations in the re-encoded channel signal. As discussed below in conjunction with FIG. 9, a set-top box can use this dimension and location information when blending an overlay frame with a video-frame region.

Figure 9:
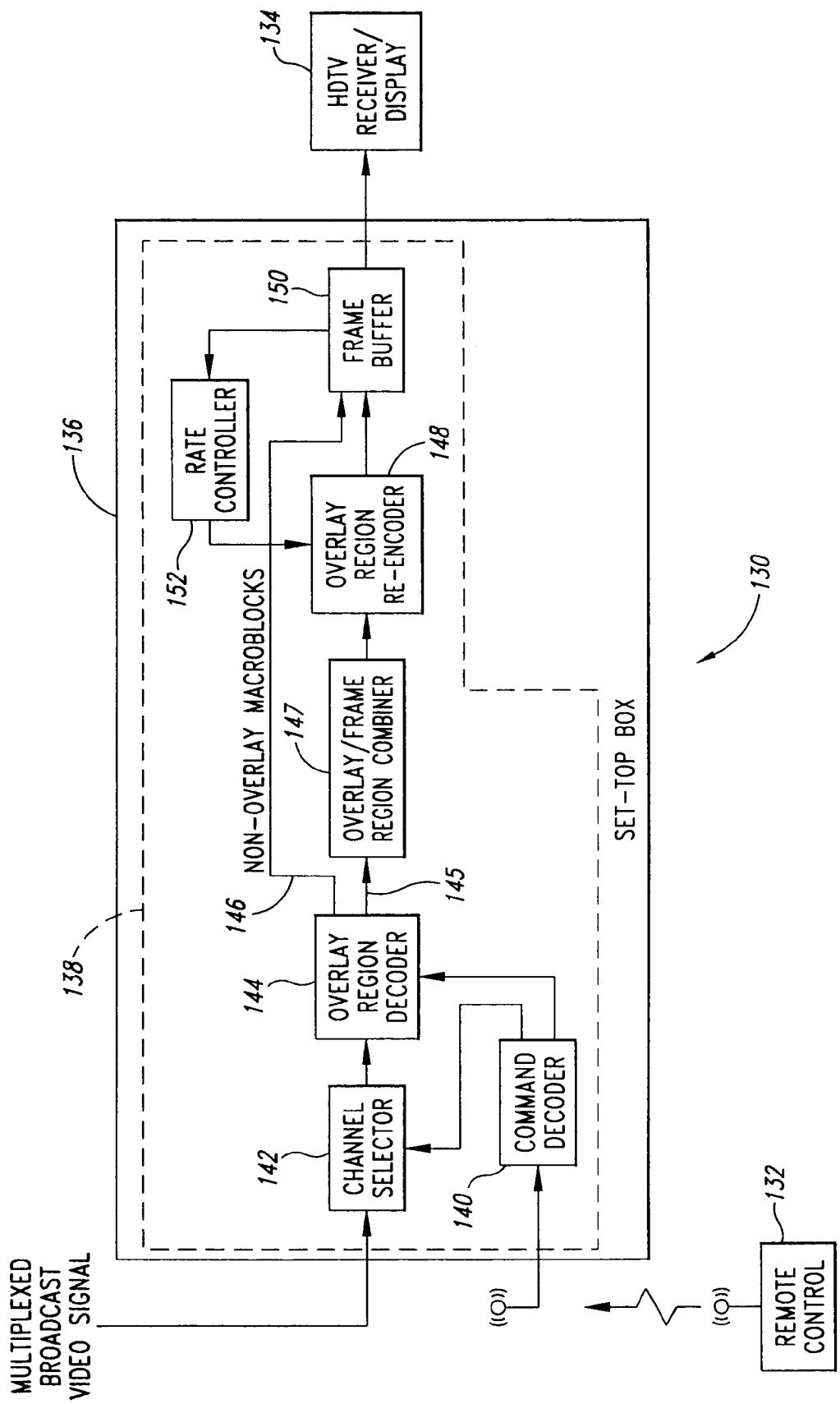
FIG. 9 is a block diagram of a set-top box according to an embodiment of the invention.

As discussed below in conjunction with FIG. 9, the increased cost for the processing power that allows the video processing circuits $102_1$–$102_N$ to format video frames into multiple independent regions will be more than offset by the reduced complexity and cost of the set-top box (FIG. 9). The overall cost savings is actually very significant, because for every frame formatter 100, which will typically be installed in a cable-company office, there will be hundreds, thousands, or even millions of set-top boxes. Thus, the combined cost savings for the set-top boxes will likely be much greater than the increased cost of installing one formatter 100 in a cable-company office.

Modifying an Image Region

Figure 1:
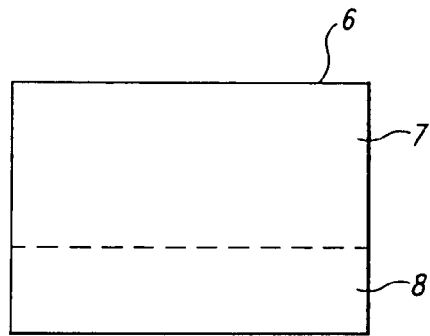
FIG. 1 is a diagram of a video frame that includes a conventional overlay region.
Figure 2:
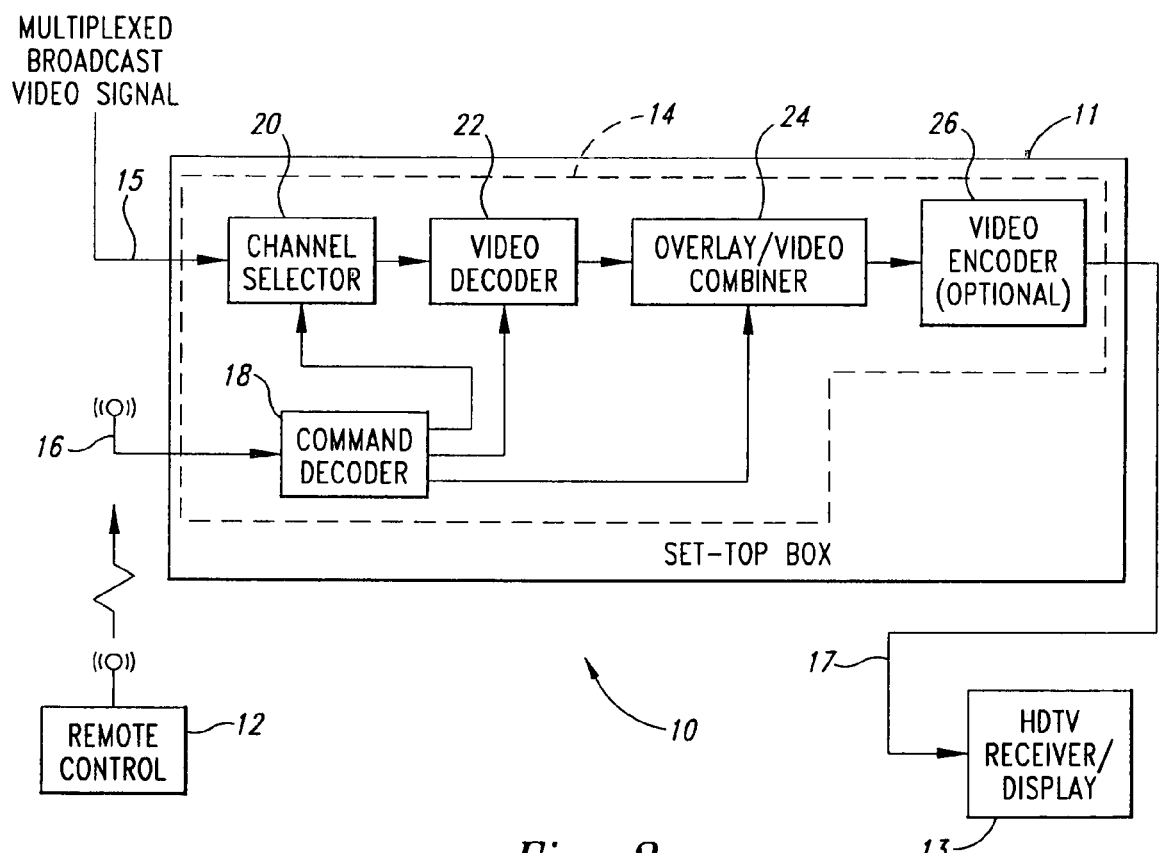
FIG. 2 is a block diagram of a conventional television receiving-and-display system that includes a set-top box for blending an overlay image with overlay regions of respective video frames.
Figures 3A, 3B, 3C, 3D:
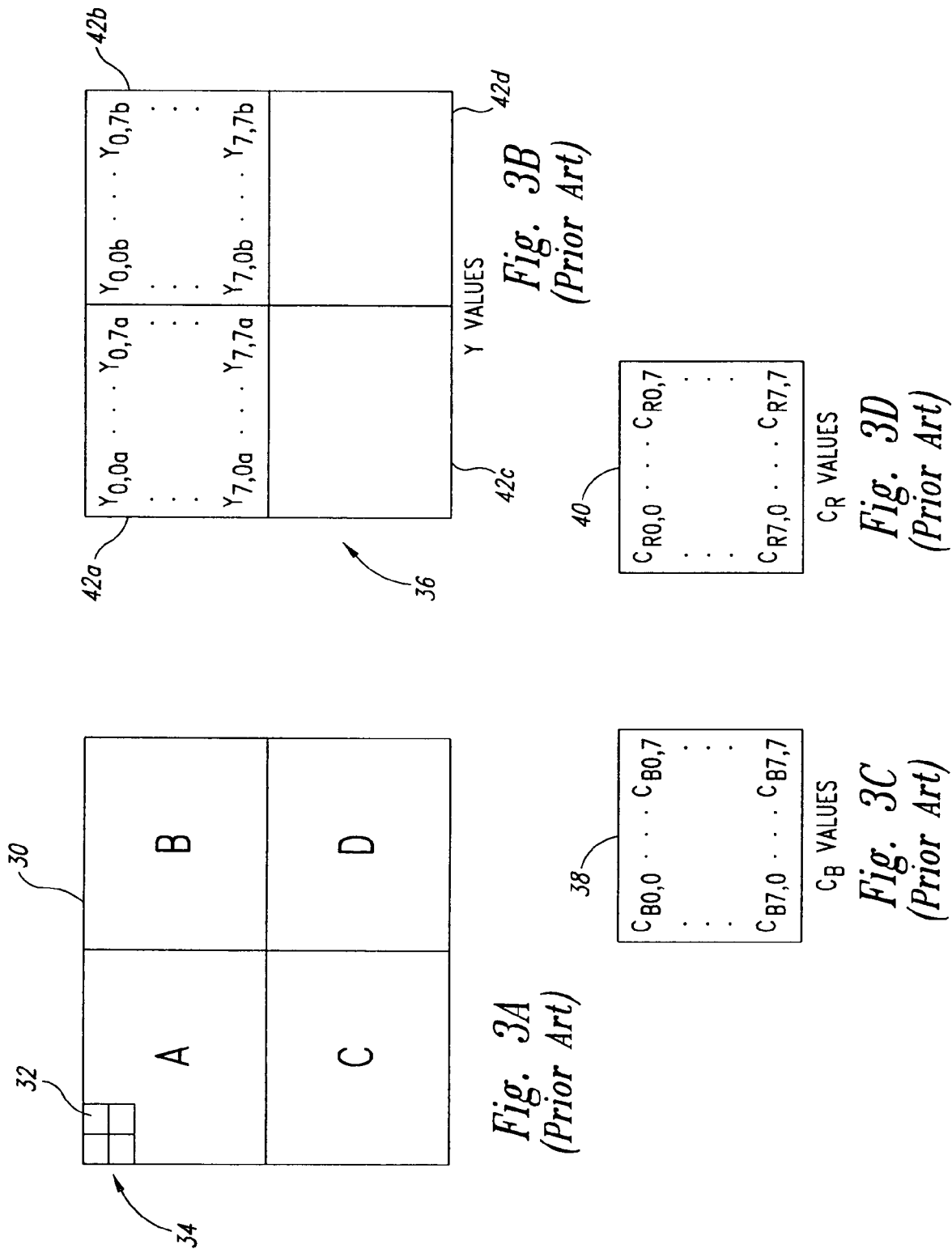
FIG. 3A is a diagram of a conventional macro block of pixels in an image.
FIG. 3B is a diagram of a conventional block of pre-compression luminance values that respectively correspond to the pixels in the macro block of FIG. 3A.
FIGS. 3C and 3D are diagrams of conventional blocks of pre-compression chroma values that respectively correspond to the pixel groups in the macro block of FIG. 3A.

FIG. 9 is a block diagram of a television receiver system 130 according to an embodiment of the invention. The system 130 includes a remote control 132 and an HDTV receiver/display 134, which are respectively similar to the remote control 12 and the receiver/display 13 of FIG. 2. The system also includes a set-top box 136, which blends overlay frames with regions of respective video frames. For example purposes, the structure and operation of the box 136 is discussed with reference to the frames 114, 116, and 118 of FIG. 8 and to an EPG as the overlay frame. It is understood, however, that this discussion is applicable to video frames having a different formatting and to different overlay frames. Generally, in the discussed example, the box 136 blends the EPG with the regions 122*a*–122*c* of the frames 114, 116, and 118. Because the regions 122*a*–122*c* are encoded independently of the regions 120*a*–120*c*, the box 136 need only decode and re-encode the regions 122*a*–122*c*. Therefore, because the box 136 need not decode or re-encode the regions 120*a*–120*c*, it can have significantly less processing power than, and thus can be significantly less expensive than, the conventional set-top box 11 (FIG. 2), which must decode and re-encode the frames in their entirety to perform this blending.

The set-top box 136 of the system 130 includes a processing circuit 138, which receives an encoded, multiplexed broadcast video signal from a cable or satellite company. In response to a channel-select signal from a command decoder 140, a channel selector 142 demultiplexes the broadcast signal and provides a selected video-channel signal to an overlay-region decoder 144.

When the viewer wants to view an overlay frame such as an EPG, he manipulates the remote control 132 to generate an overlay command. The command decoder 140 generates an overlay signal in response to the overlay command. In response to the overlay signal, the decoder 144 decodes the overlay frames and the overlay frame regions with which the overlay frames will be blended. For example, referring to FIG. 8, the decoder 144 decodes the EPG and the overlay regions 122*a*–122*c* of the frames 114, 116, and 118, respectively. For reasons discussed above in conjunction with FIG. 7, the decoder 144 decodes the EPG and the overlay regions 122*a*–122*c* down to the transform domain or all the way down to the pixel domain. The decoder 144 does not, however, decode the non-overlay frame regions 120*a*–120*c*. Therefore, the decoder 144 provides the decoded EPG and overlay frame regions 122*a*–122*c* on an output terminal 145, and passes through the undecoded non-overlay regions 120*a*–120*c* to an output terminal 146.

An overlay/region combiner 147 is coupled to the output terminal 145 of the decoder 144 and blends the decoded overlay frames with the decoded frame overlay regions in a manner described below. For example, the decoder 144 blends the decoded EPG with the decoded overlay frame regions 122*a*–122*c*.

An overlay region re-encoder 148 re-encodes the blended overlay frame regions using conventional encoding techniques similar to those discussed above in conjunction with FIG. 4. For example, the re-encoder 148 re-encodes the blended overlay frame regions 122*a*–122*c*.

A frame buffer 150 receives the re-encoded overlay frame regions from the re-encoder 148 and receives the undecoded non-overlay frame regions that the overlay region decoder 144 passes through via the output terminal 146. The frame buffer 150 stores the undecoded and re-encoded frame regions in respective buffer sections to "reassemble" the video frames. For example, the buffer 150 stores the undecoded non-overlay regions 120*a*–120*c* in a first set of buffer sections, and stores the re-encoded overlay regions 122*a*–122*c* in a second set of buffer sections (buffer sections not shown in FIG. 9). The buffer 150 then provides the contents of the first and seconds sets of buffer sections to the display 134 such that the regions 120*a* and 122*a* are provided as a single frame, and so on.

Figure 4:
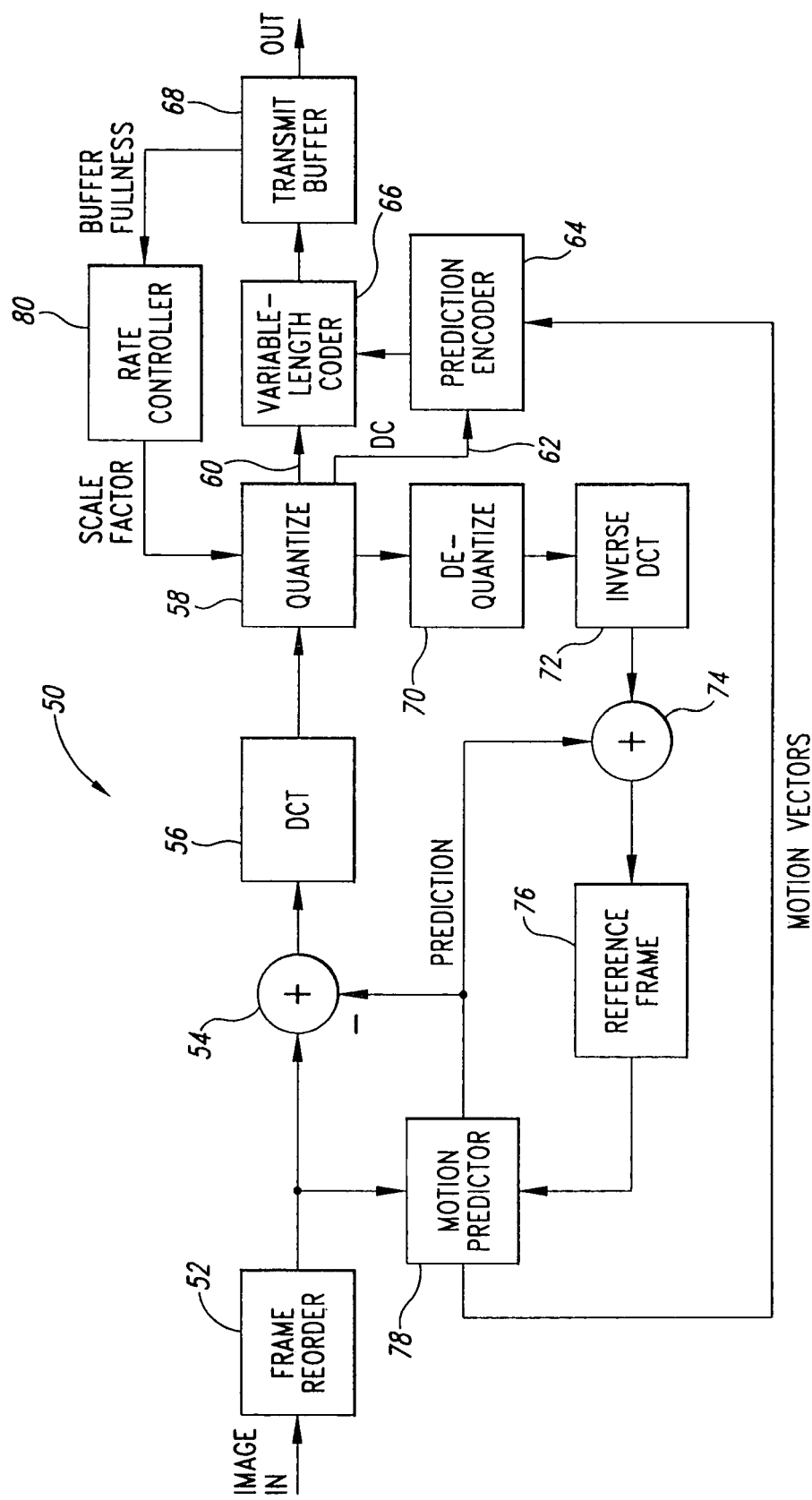
FIG. 4 is a block diagram of a conventional MPEG encoder.
Figure 5:
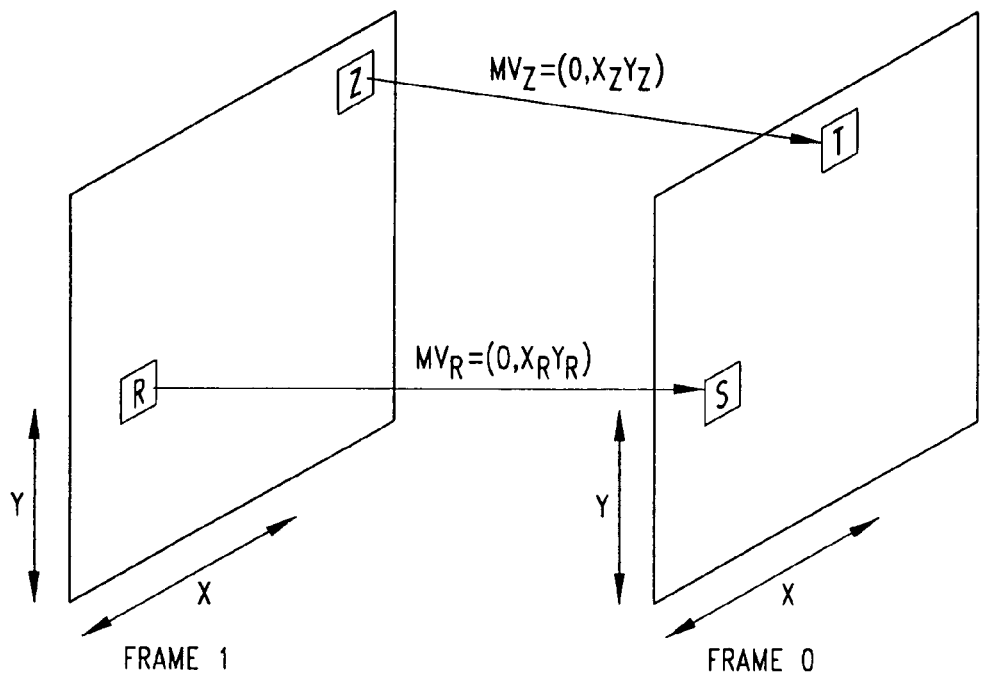
FIG. 5 is a diagram that illustrates the concept of conventional motion vectors.
Figure 6:
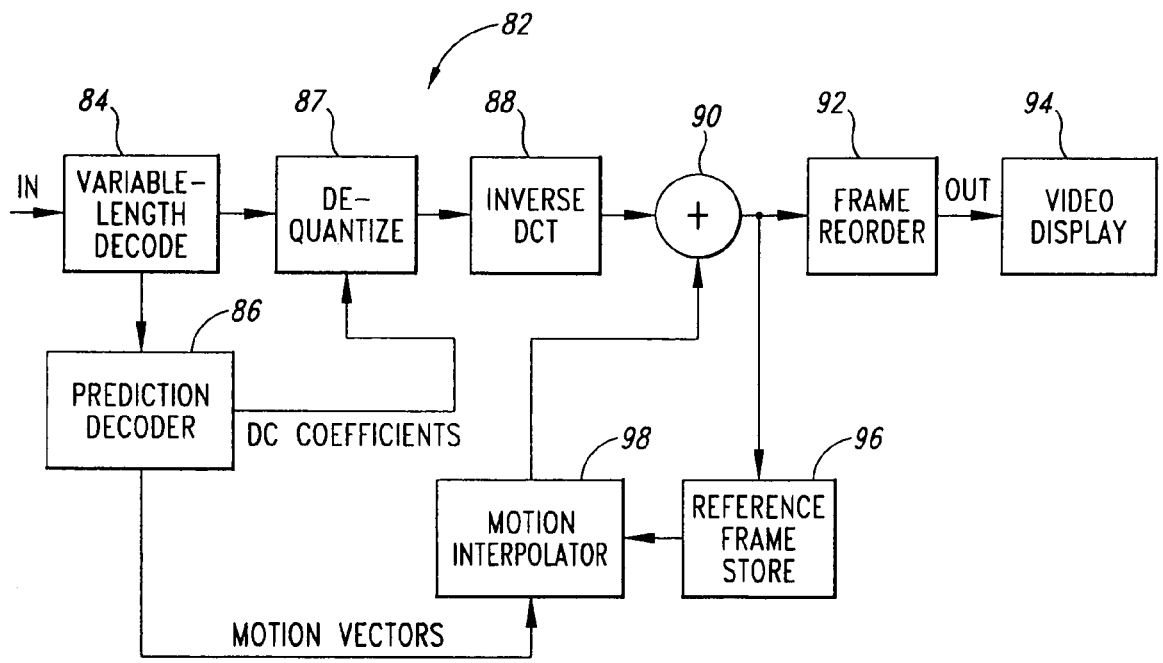
FIG. 6 is a block diagram of a conventional MPEG decoder.

A rate controller 154, which is similar to the rate controller 80 of FIG. 4, monitors the fullness of the buffer 150 and prevents the buffer 150 from overflowing or underflowing by controlling the degree of quantization used by the re-encoder 148.

The display 134 decodes and displays the reassembled video frames from the set-top box 136. In the given example, the display 134 displays the frames 114, 116, and 118 having the EPG in the regions 122*a*, 122*b*, and 122*c*, respectively.

Therefore, by decoding and re-encoding only the overlay frame regions with which overlay frames will be blended, the processing circuit 138 can be much less complex, and thus much less expensive, than processing circuits that decode and re-encode the frames in their entirety.

In one embodiment as discussed above in conjunction with FIG. 7, the channel signal includes the locations (within the respective frames) and the dimensions of the regions 122*a*–122*c*, and the processing circuit 138 uses this information to properly configure the decoder 144, combiner 147, re-encoder 148, and frame buffer 150. This allows the cable or satellite operator to change the dimensions or location of the regions 122*a*–122*c* without requiring hardware modifications to the set-top box 136.

When the viewer does not want to view an overlay frame such as the EPG, the processing circuit 138 does not process the encoded video frames from the channel selector 142, but instead passes them through to the frame buffer 150. Specifically, the remote control 132 does not generate an overlay command, and thus the command decoder 140 does not generate the overlay signal. In the absence of the overlay signal, the overlay region decoder 144 passes through the previously encoded video frames in there entirety from the channel selector 142 to the output terminal 146. For example, referring to FIG. 8, the decoder 144 performs no decoding, and thus passes the undecoded frame regions 120*a*–120*c* and 122*a*–122*c* to the output terminal 146. In one embodiment, however, the decoder 144 does not pass through the EPG to either of the output terminals 145 and 146. That is, the decoder 144 prevents the processing circuit 138 from providing the EPG to the display 134. Furthermore, because the decoder 144 does not provide a decoded overlay frame and decoded frame regions on the output terminal 145, the combiner 147 and re-encoder 148 are effectively inactive. Therefore, the frame buffer 150 receives the undecoded frames 114, 116, and 118 in their entirety from the output terminal 146 of the decoder 144, and provides these undecoded frames to the display 134.

Still referring to FIG. 9, in one embodiment of the invention, the overlay/frame-region combiner 147 blends the overlay frame with the overlay frame regions on a pixel-by-pixel basis using conventional alpha blending. Alpha blending is defined by the following equation:

$$\text{Blended pixel value} = (\alpha) \times (\text{frame pixel value}) + (1-\alpha) \times (\text{overlay pixel value}) \quad (1)$$

Assuming that the overlay image is an EPG, if a particular EPG pixel (overlay pixel) is opaque, then $\alpha=0$ such that the EPG pixel completely blocks the coincident overlay-frame-region pixel (frame pixel) from view. That is, the coincident frame pixel is invisible, i.e., transparent, if $\alpha=0$. Likewise, if the particular EPG pixel is transparent, then $\alpha=1$ such that coincident frame pixel is opaque. For $0<\alpha<1$, as α increases from 0, the EPG pixel gradually fades out and the coincident frame pixel gradually fades in. Furthermore, because alpha blending is a linear function, the combiner 147 can perform it in the transform domain or in the pixel domain. Thus, as discussed above, the overlay region decoder 144 can decode the macro blocks of the regions 122a–122c (FIG. 8) down to the transform domain or the pixel domain.

In an embodiment where the overlay frame is opaque, the re-encoder 148 provides a relatively high number of quantization levels to preserve the higher frequencies in the overlay frame regions. For example, referring to FIG. 8, this low degree of quantization sharpens the edges of the EPG characters (not shown in FIG. 8) in the overlay regions 122a–122c. In some cases, this may cause the regions 120a–120c to have different quantization levels than the regions 122a–122c. But because the regions 120a–120c and 122a–122c are MPEG slices as discussed above in conjunction with FIGS. 7–8, the display 134 can easily change its dequantization levels as it moves from one slice to the other—for example from the region 120a to the region 122a—during the decoding of the frame 114. That is, the display 134 uses one set of dequantization levels to decode the regions 120a–120c and another set of dequantization levels to decode the regions 122a–122c. In one embodiment, the respective dequantization levels needed to decode the regions 120a–120c are conventionally generated and included in the channel signal by the re-encoder $112_1$ of FIG. 7 and are passed through to the display 134 by the processing circuit 138. Likewise, the dequantization levels needed to decode the regions 122a–122c are generated and included with the re-encoded overlay frame regions by the re-encoder 148 of FIG. 9 and are passed to the display 134 by the buffer 150.

As discussed above for the re-encoder $112_1$ of the video-frame formatting system 100, the re-encoder 148 can re-encode the macro blocks of the blended overlay frame regions in a number of ways. For example, referring to FIG. 8, according to a first technique, the re-encoder 148 re-encodes all the macro blocks of the regions 122a–122c as I blocks. Or, according to a second technique, the re-encoder 148 re-encodes at least some of these macro blocks so that they have motion vectors with location values of 0. This is particularly efficient if the EPG is stationary and opaque, since all of the macro blocks in the regions 122a–122c will be the same from frame to frame.

Alternatively, if the EPG scrolls at a known constant rate, then according to a third technique, the re-encoder 148 re-encodes at least some of the macro blocks to have motion vectors with constant, nonzero location values based on the scroll rate. That is, if the scroll rate is constant, then the re-encoder 148 can calculate from the scroll rate how far a macro block in the region 122 of one frame has moved in the region 122 of the next frame. If the EPG scrolls in a vertical direction, then the motion-vector location values will be (0, Y), where the value of Y is based on the vertical scroll rate. Conversely, if the EPG scrolls in a horizontal direction, then the motion-vector location values will be (X, 0), where the value of X is based on the horizontal scroll rate. This re-encoding technique is particularly efficient if the EPG is opaque. Sometimes, however, the EPG is not opaque. That is, the EPG characters are opaque but the spaces between the characters are transparent to show the original scene. In this situation, therefore, this re-encoding technique is often inefficient because of relatively large residuals.

According to a fourth technique, the re-encoder 148 re-encodes the blended overlay frame regions using full-scale motion encoding as discussed above in conjunction with FIG. 4. For example, the re-encoder 148 re-encodes the region 122b by scanning the region 122a for reference macro blocks and then generating corresponding motion vectors and residuals.

Generally, the first technique requires the least processing power but is the least efficient, the fourth technique requires the most processing power but is the most efficient, and the second and third techniques fall in between. Because the rate controller 152 ensures that there is no overflow of the buffer 150, the lower the efficiency of a re-encoding technique, the greater the losses incurred by the re-encoding process. These losses may show up as undesirable visual artifacts in the overlay frame regions when an overlay frame like the EPG is viewed.

Still referring to FIG. 9, in embodiments where it is desired that the overlay frame have a relatively high visual quality or where the overlay frame region is relatively large, the processor 138 can implement an I-frame-only mode during which it "skips" the non-overlay frame information to reduce the number of bits in the re-encoded channel signal. This technique, which is often called "skipping the background", virtually insures that the frame buffer 150 will not overflow when the re-encoder 148 uses a low degree of quantization to generate high-quality overlay frame regions. For example, referring to FIG. 8, the combiner 147 combines the EPG with the regions 122 of the I frames (like region 122a of the frame 114) and stores only these modified I frames in the frame buffer 150. The buffer 150 provides these I frames to the display 134 by repeatedly sending the most recent, i.e., current, I frame (or by instructing the display 134 to repeatedly display the current I frame) until the combiner 147 and re-encoder 148 process the next I frame. Because the ratio of I frames to non-I frames in a GOP is relatively low, for example 1/15, the I-frame-only mode may cause jerky motion in the non-EPG frame regions 120. If the EPG is not opaque, then such jerky motion might also be visible in the background of the EPG regions 122 as well. But because such jerky motion is visible only while the display 134 displays the EPG, because a viewer typically displays the EPG for only a relatively small fraction of his/her total viewing time, and because the viewer is more likely to concentrate on the EPG than the background, the jerky motion during EPG viewing is often unnoticeable, or is at least acceptable, to the viewer.

Referring to FIGS. 8 and 9, where the overlay frame is not opaque, a modification of the I-frame-only technique is to skip the background only in the non-overlay regions. For example, the overlay decoder 144 passes through only the encoded non-overlay regions 120 of the I frames to the buffer 150, but continues to provide the EPG and the overlay regions 122 of all the frames to the combiner 147. The combiner 147 and the re-encoder 148 operate as described above such that the blended regions 122 have normal motion. The buffer 150 then combines the region 120 of the current I frame with the regions 122 of the current I frame and the subsequent non-I frames, respectively. Therefore, the display 134 displays the blended video frames having normal motion in the regions 122 and jerky motion only in the regions 120. The processing circuit 138 can also be designed to blend the EPG with the overlay regions 122 such that the processed frames have normal motion in the regions 120 and jerky motion in the regions 122.

Referring to FIG. 9, although described as including separate circuit blocks 140, 142, 144, 147, 148, 150, and 152, the processor circuit 138 may include one or more processors that perform the functions of these circuit blocks in hardware or software. Additionally, the above-described functions may be performed in an order other than that described above. Furthermore, although shown as part of the processing circuit 138, the command decoder 140 and the channel selector 142 may be separate from the circuit 138.

Figure 10:
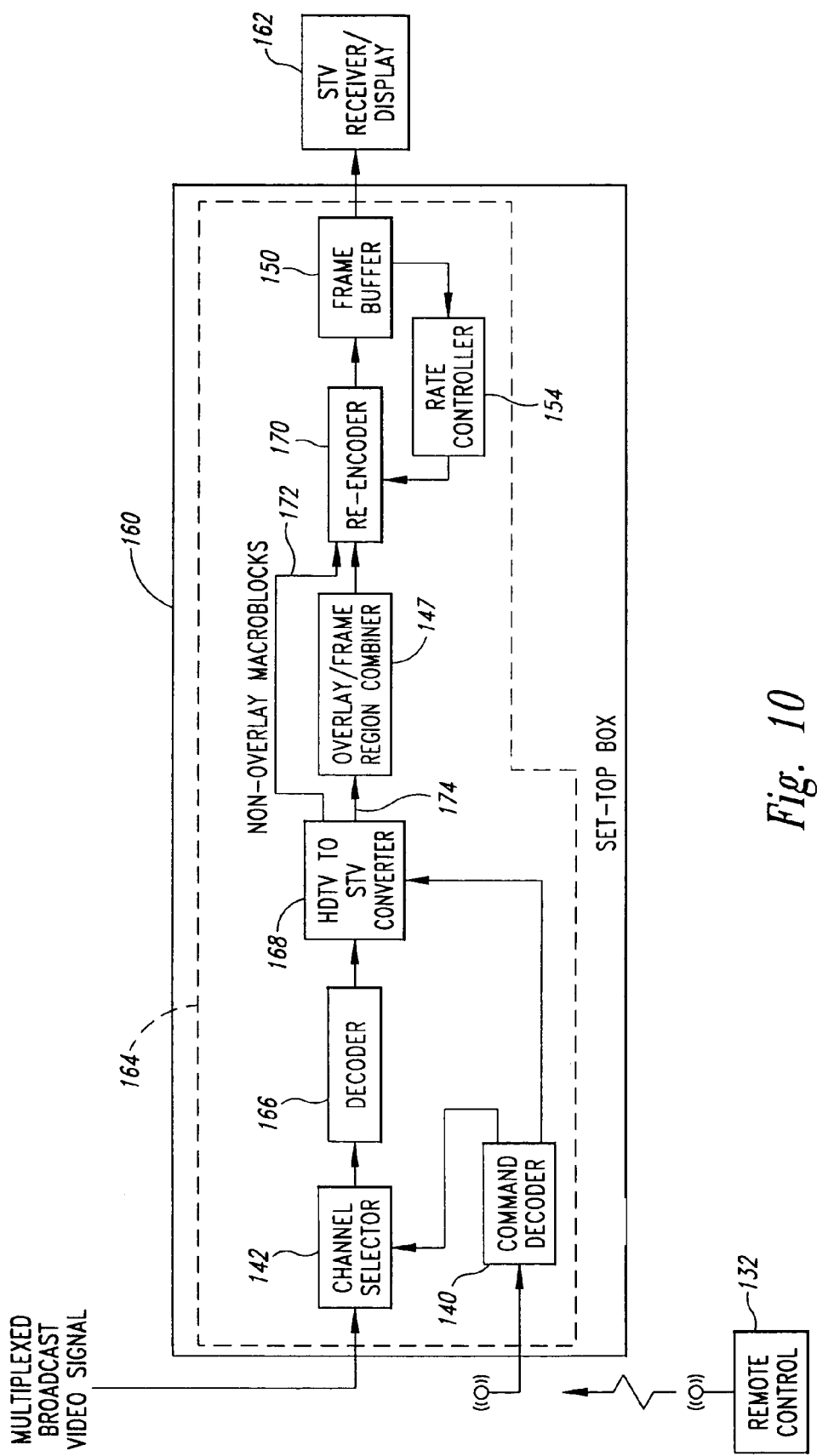
FIG. 10 is a block diagram of a set-top box according to another embodiment of the invention.

FIG. 10 is a block diagram of a set-top box 160 according to another embodiment of the invention. The box 160 is similar to the box 136 of FIG. 9 except that it also converts a HDTV video signal down to a standard television (STV), i.e., lower resolution, video signal for display on an STV receiver/display 162.

The box 160 includes a processing circuit 164, which is similar to the processing circuit 138 of FIG. 9 except that it includes a conventional decoder 166 and a conventional HDTV-to-STV converter 168. The converter 168 reduces the number of pixels, and thus the resolution, of each of the frames that the box 160 provides to the display 162. As is known, the converter 168 can perform this reduction in either the transform or pixel domains. Accordingly, the decoder 166 decodes the video frames of the selected channel signal to whichever domain the converter 168 calls for. Furthermore, because the decoder 166 decodes each frame in its entirety to allow the converter 168 to down convert the frames, the circuit 164 includes a re-encoder 170 that re-encodes both the overlay and non-overlay frame regions.

When a viewer does not want to view an overlay frame, the command decoder 140 generates no overlay signal. In the absence of the overlay signal, the converter 168 down converts the decoded video frames from the decoder 166 and provides the down-converted frames in their respective entireties to the re-encoder 170 via a line 172. The re-encoder 170 re-encodes the down-converted frames and provides them to the frame buffer 150. The display 162 decodes and displays the re-encoded frames from the buffer 150.

When the viewer wants to view an overlay frame, the command decoder 140 generates the overlay signal in response to a command from the remote control 132. Referring to FIG. 8 for example purposes, in response to the overlay signal, the converter 168 down converts the decoded frames and the decoded EPG from the decoder 166, provides the down-converted frame regions 120a–120c to the re-encoder 170 via the line 172, and provides the down-converted frame regions 122a–122c and the down-converted EPG to the overlay/frame combiner 147 via a line 174. The combiner 147 blends the EPG and the regions 122a–122c as discussed above in conjunction with FIG. 9. The re-encoder 170 re-encodes the decoded regions 120a–120c and the blended regions 122a–122c in a manner similar to that discussed above in conjunction with FIG. 9. The re-encoder 170 provides these re-encoded regions to the buffer 150, which stores these regions as respective re-encoded frames for display on the display 162. The rate controller 154 prevents the buffer 150 from overflowing or underflowing as discussed above in conjunction with FIG. 9.

Referring to FIG. 10, although described as including separate circuit blocks 140, 142, 147, 150, 154, 166, 168, and 170, the processor circuit 164 may include one or more processors that perform the functions of these circuit blocks in hardware or in software. Additionally, the above-described functions may be performed in an order other than that described above. Furthermore, although shown as part of the processing circuit 164, the command decoder 140 and the channel selector 142 may be separate from the circuit 164.

From the foregoing it will be appreciated that, although specific embodiments of the invention have been described herein for purposes of illustration, various modifications may be made without deviating from the spirit and scope of the invention.

What is claimed:

1. A video processing circuit, comprising:
a processor operable to:
receive a signal including an overlay frame and an encoded image frame having first and second regions;
decode the overlay frame and the first region of the image frame;
modify the decoded first region of the image frame to include the decoded overlay frame; and
re-encode the modified first region of the image frame;
where the overlay frame is distinct from the encoded image frame including the first and second regions in the signal.

2. The video processing circuit of claim 1 wherein the processor is operable to combine the encoded second region of the image frame and the re-encoded first region of the image frame to generate an encoded modified image frame.

3. The video processing circuit of claim 1 wherein the processor is operable to:
decode the first region into a transform domain; and
modify the decoded first region in the transform domain.

4. The video processing circuit of claim 1 wherein the processor is operable to:
decode the first region into a pixel domain; and
modify the decoded first region in the pixel domain.

5. The video processing circuit of claim 1 wherein:
the first region has dimensions and a location within the image frame; and
the processor is operable to receive the dimensions and location of the first region within the image frame.

6. The video processing circuit of claim 1 wherein the processor is operable to:
store the re-encoded modified first region and the second region.

7. The video processing circuit of claim 6 comprising a buffer to store the re-encoded modified first region and the second region.

8. The video processing circuit of claim 6 wherein the processor is operable to decode the first region of the image and the overlay frame by identifying motion vectors.

9. A method comprising:
receiving a video signal including an encoded image frame and an overlay frame;
decoding a first region of the encoded image having the first region and a second region;
decoding the overlay frame;
in response to an overlay command, modifying the decoded first region to include the decoded overlay frame; and
re-encoding the modified first region;
where the overlay frame is distinct from the encoded image frame including the first and second regions in the signal.

10. The method of claim 9, further comprising combining the encoded second region of the image frame and the re-encoded first region of the image to form an encoded modified image frame.

11. The method of claim 9 wherein:
the decoding comprises decoding first region into a transform domain; and
the modifying comprises modifying the decoded first region in the transform domain.

12. The method of claim 9 wherein:

the decoding comprises decoding the first region into a pixel domain; and the modifying comprises modifying the decoded first region in the pixel domain.

13. The method of claim 9 comprising storing the re-encoded modified first region and the second region.

14. The method of claim 9 including re-encoding the modified first region responsive to rate controlling.

* * * * *

UNITED STATES PATENT AND TRADEMARK OFFICE
CERTIFICATE OF CORRECTION

| | | |
|---|---|---|
| PATENT NO. | : 7,194,032 B1 | |
| APPLICATION NO. | : 09/390241 | |
| DATED | : March 20, 2007 | |
| INVENTOR(S) | : Venkat V. Easwar et al. | |

It is certified that error appears in the above-identified patent and that said Letters Patent is hereby corrected as shown below:

On the Title page, Item (75), the inventor "Robert J. Grove" should read -- Robert J. Gove --.

Signed and Sealed this
Twenty-second Day of March, 2011

David J. Kappos
*Director of the United States Patent and Trademark Office*